(12) United States Patent
Noguchi

(10) Patent No.: US 7,632,027 B2
(45) Date of Patent: Dec. 15, 2009

(54) OPTICAL APPARATUS

(75) Inventor: Kazuhiro Noguchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 407 days.

(21) Appl. No.: 11/764,367

(22) Filed: Jun. 18, 2007

(65) Prior Publication Data

US 2007/0297793 A1  Dec. 27, 2007

(30) Foreign Application Priority Data

Jun. 23, 2006  (JP) .............................. 2006-174416

(51) Int. Cl.
  *G03B 17/00* (2006.01)
  *B42F 1/00* (2006.01)
(52) U.S. Cl. .................... 396/529; 359/819; 24/457
(58) Field of Classification Search .................. 396/17, 396/439, 529, 531, 535, 541; 24/336, 455, 24/457, 462, 570; 403/24, 104, 206, 208; 348/208.11
See application file for complete search history.

(56) References Cited

U.S. PATENT DOCUMENTS 5,768,649 A * 6/1998 Pearson ...................... 396/529

FOREIGN PATENT DOCUMENTS

| JP | 2001-290184 | 10/2001 |
|---|---|---|
| JP | 2003-295249 | 10/2003 |

\* cited by examiner

*Primary Examiner*—Melissa J Koval
*Assistant Examiner*—Autumn Parker
(74) *Attorney, Agent, or Firm*—Rossi, Kimms & McDowell, LLP

(57) ABSTRACT

An optical apparatus is disclosed which has a minimized protruding portion at a portion where a plurality of barrel-constituting members are connected and which allows easy assembly and disassembly. The optical apparatus includes a first member and a second member which constitute a lens barrel for accommodating lenses and a connecting member which connects the first and second members together. The connecting member is formed of a plate-like member placed along the outer surfaces of the first and second members, is elastically deformed when the connecting member is attached to the first and second members, and pulls the first and second members in and connects them with elastic force caused by the elastic deformation.

9 Claims, 14 Drawing Sheets

OPTICAL APPARATUS

BACKGROUND OF THE INVENTION

The present invention relates to an optical apparatus such as a video camera, a digital still camera, and an interchangeable lens.

An optical apparatus has a lens barrel for accommodating lenses that is formed of a combination of a plurality of members (barrel-constituting members). The barrel-constituting members are often connected by screws to achieve easy assembly, reliable securing, and easy disassembly (see Japanese Patent Laid-Open No. 2001-290184 and Japanese Patent Laid-Open No. 2003-295249).

FIG. 11 schematically shows a video camera in the prior art. Reference numeral 101 shows a lens barrel, 102 a recording/reproduction unit, 103 an electric circuit board, 104 a liquid crystal display, 105 a battery, and 106 an external member.

The lens barrel 101 has flange portions 101a to 101c formed on its outer circumference for allowing connection of a plurality of barrel-constituting members placed in the direction of an optical axis by screws extending in a direction in parallel with the optical axis.

The lens barrel of the optical apparatus incorporates a number of members including a plurality of lenses, optical components such as an aperture and an ND filter, actuators for driving thereof, as well as a detector for detecting the position of an image stabilization lens unit or a movable optical component. On the other hand, the optical apparatus needs to be reduced in size and to have a shape with few protruding portions for the purpose of improved portability and storage.

The flange portions 101a to 101c of the lens barrel 101 for connection of the plurality of barrel-constituting members by screws as shown in FIG. 11, however, require convex portions 106a and 106b of the external member 106 that fit the protruding flange portions. Alternatively, the external member 106 is necessarily formed to be larger than the lens barrel 101 as shown by a broken line 106c. In other words, it is difficult to realize the optical apparatus which has a reduced size and a shape with few protruding portions.

Since the lens barrel is typically placed in an end portion of the optical apparatus to occupy a relatively large area thereof, the convex portions or the larger size of the external member close to the lens barrel significantly contributes to an increase in size of the overall optical apparatus.

BRIEF SUMMARY OF THE INVENTION

It is an object of the present invention to provide an optical apparatus which has a smaller protruding portion at a portion where a plurality of barrel-constituting members are connected and which allows easy assembly and disassembly.

According to an aspect, the present invention provides an optical apparatus including a first member and a second member which constitute a lens barrel for accommodating a lens, and a connecting member which connects the first and second members together. The connecting member is formed of a plate-like member placed along the outer surfaces of the first and second members, is elastically deformed when the connecting member is attached to the first and second members, and pulls the first and second members in and connects them with elastic force caused by the elastic deformation.

Other objects and features of the present invention will be apparent from the following description of a preferred embodiment with reference to the accompanying drawings.

DETAILED DESCRIPTION OF THE PREFERRED EMBODIMENTS

A preferred embodiment of the present invention will hereinafter be described with reference to the drawings.

Figure 1:
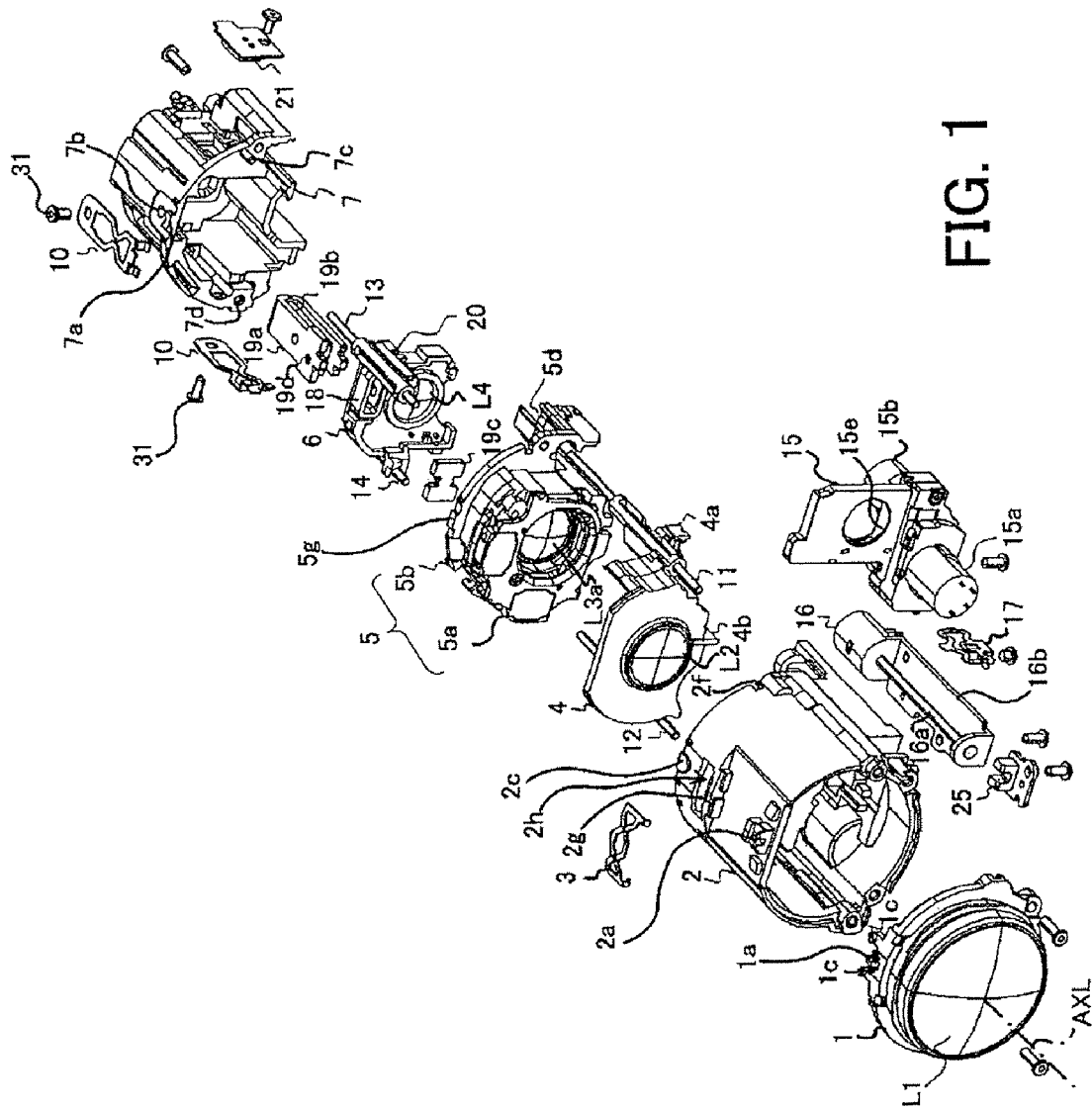
FIG. 1 is an exploded perspective view showing a lens barrel portion of a video camera which is an embodiment of the present invention.
Figure 2:
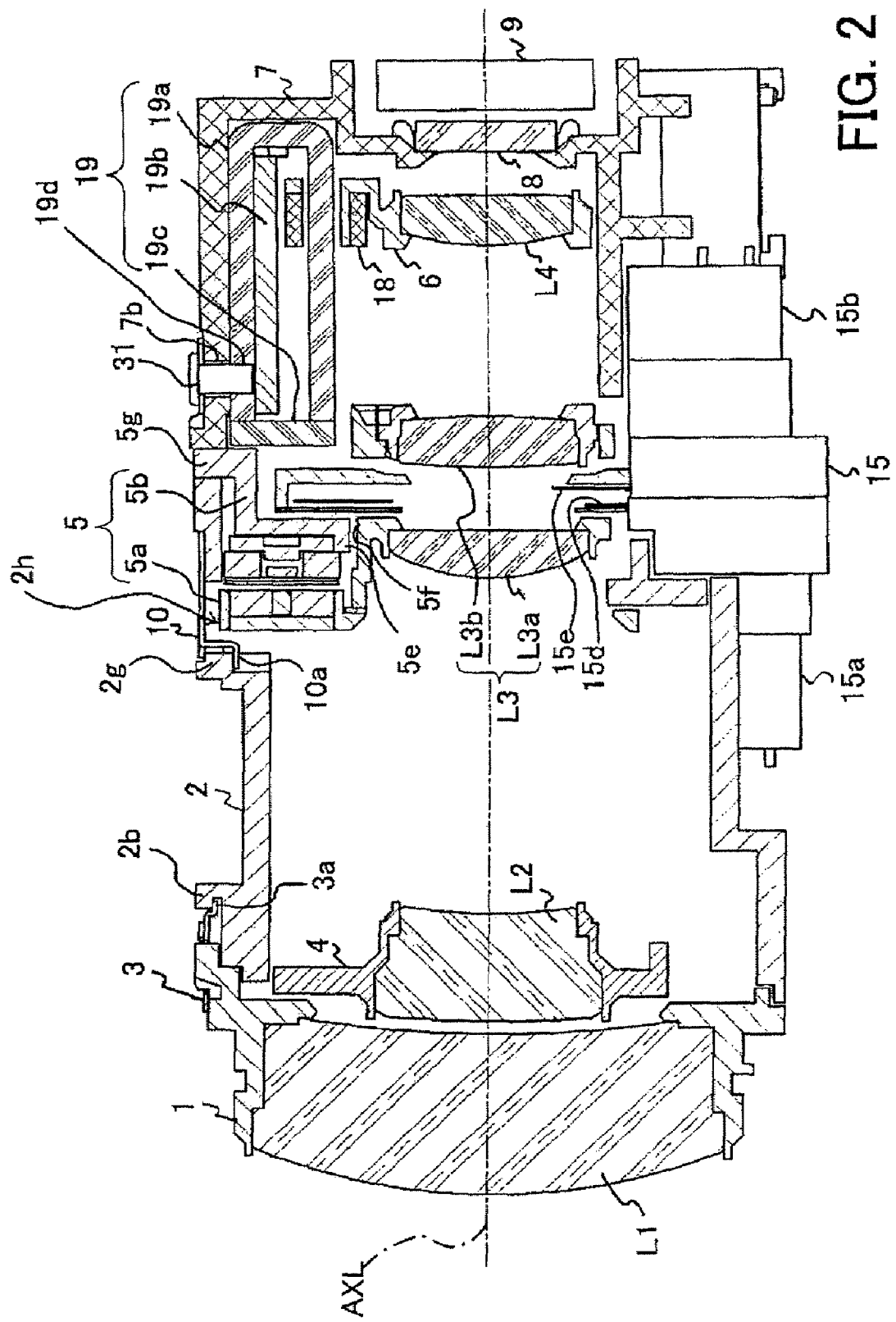
FIG. 2 is a section view showing the lens barrel portion of the embodiment.

FIGS. 1 and 2 show the structure of a lens barrel portion of a video camera (optical apparatus) which is an embodiment of the present invention. The lens barrel of the present embodiment accommodates a variable-magnification optical system which includes four lens units, that is, a convex lens, a concave lens, a convex lens, and a convex lens in order from an object side. FIG. 1 is an exploded perspective view of the lens barrel portion, and FIG. 2 is a section view of the lens barrel portion. In the following description, the object side (left side in FIGS. 1 and 2) is referred to as the front side, while an image side (right side in FIGS. 1 and 2) is referred to as the rear side.

In FIGS. 1 and 2, reference numeral L1 shows a fixed first lens unit and L2 a second lens unit which is movable in the direction of an optical axis AXL to provide variable magnification. A third lens unit L3 is an image stabilization lens unit which is movable in a plane orthogonal to the optical axis AXL to correct image shake. The image stabilization lens unit L3 is formed of lens components L3a and L3b on the front and rear sides, respectively, that are moved together in the plane orthogonal to the optical axis. Reference numeral L4 shows a fourth lens unit which is movable in the optical axis direction to perform focus adjustment operation.

Reference numeral 1 shows a first barrel which holds the first lens unit L1, 2 a front-side fixed barrel, and 3 a first connecting sheet metal serving as a connecting member. The first barrel 1 is secured to the front-side fixed barrel 2 in the optical axis direction by two screws and the first connecting sheet metal 3. The first barrel 1 and the front-side fixed barrel 2 serve as a first member and a second member, respectively, for the first connecting sheet metal 3. The details of how to connect them are described later.

Reference numeral 4 shows a second movable frame which holds the lens unit L2. Reference numeral 5 shows an image stabilization unit which includes a movable portion 5a which holds the lens components L3a and L3b constituting the third lens unit L3 and moves in the plane orthogonal to the optical axis and a fixed portion 5b which movably holds the movable portion 5a in the plane orthogonal to the optical axis.

Reference numeral 6 shows a fourth movable frame which holds the fourth lens unit L4. Reference numeral 7 shows a rear-side fixed barrel which holds an image-pickup device 9 formed of a CCD sensor or a CMOS sensor, for example. The rear-side fixed barrel 7, the abovementioned front-side fixed barrel 2, the fixed portion 5b of the image stabilization unit 5, and a motor support plate 16b of a zoom motor 16, later described, correspond to barrel-constituting members, and they are connected together to provide a lens barrel which accommodates the variable-magnification optical system.

The image-pickup device 9 converts an optical image formed by the variable-magnification optical system into an electric signal. Reference numeral 8 shows an optical filter which has functions of blocking infrared rays and serving as a low-pass filter for light traveling toward the image-pickup device 9.

Reference numeral 10 shows a second connecting sheet metal serving as a connecting member. The front-side fixed barrel 2 and the rear-side fixed barrel 7 are connected together with the image stabilization unit 5 sandwiched therebetween by one screw and two second connecting sheet metals 10. The front-side fixed barrel 2 and the rear-side fixed barrel 7 serve as a first member and a second member, respectively, for the second connecting sheet metal 10. The details of how to connect them are described later.

Reference numerals 11 and 12 show guide bars which direct the second movable frame 4 straight in the optical axis direction. The front and rear ends of the guide bars 11 and 12 are held by the front-side fixed barrel 2 and the rear-side fixed barrel 7, respectively.

Reference numerals 13 and 14 show guide bars which direct the fourth movable frame 6 straight in the optical axis direction. The front and rear ends of the guide bars 13 and 14 are held by the fixed portion 5b of the image stabilization unit 5 and the rear-side fixed barrel 7, respectively.

Reference numeral 15 shows a light-amount adjustment unit (aperture unit) which adjusts the brightness (light amount) of an object of which image is formed on the image-pickup device 9. The light-amount adjustment unit 15 is a so-called guillotine-type light-amount adjustment unit in which two aperture blades 15b (see FIG. 2) are moved in opposite directions by a motor 15a to increase or reduce the aperture diameter. The light-amount adjustment unit 15 also adjusts the light amount by moving an ND filter 15e (see FIG. 2) into and out of the optical path by a motor 15b. The two aperture blades 15d and the ND filter 15e are disposed between the two lens components L3a and L3b of the third lens unit. The light-amount adjustment unit 15 is fixed to the fixed portion 5b of the image stabilization unit 5 by one screw.

Reference numeral 16 shows a zoom motor serving as an actuator which moves the second lens unit L2 in the optical axis direction and is realized by a stepping motor, for example. A lead screw 16a is formed on the output shaft of the zoom motor 16. The lead screw 16a engages with a rack 4a attached to the second movable frame 4. As the zoom motor 16 is operated to rotate the lead screw 16a, the second movable frame 4 and the second lens unit L2 are moved in the optical axis direction.

Each of the second movable frame 4, the guide bars 11 and 12, the rack 4a, and the lead screw 16a is urged to one side by a torsion coil spring, not shown, to eliminate play. The zoom motor 16 is supported on the motor support plate 16b which is formed by bending a sheet metal, for example.

Reference numeral 17 shows a motor connecting sheet metal serving as a connecting member. The motor support plate 16b is connected to the front-side fixed barrel 2 (image stabilization unit 5) by one screw and the motor connecting sheet metal 17. The front-side fixed barrel 2 (image stabilization unit 5) and the motor support plate 16b serve as a first member and a second member, respectively, for the motor connecting sheet metal 17. The details of how to connect them are described later.

Reference numeral 25 shows a photointerrupter which detects switching between a light-shielding state and a light-transmitting state caused by a light-shield portion 4b formed on the second movable frame 4 that is moved in the optical axis direction. The photointerrupter 25 serves as a zoom reset switch which detects the reference position of the second lens unit L2.

Reference numeral 18 shows an air-core coil which is formed in a rectangular shape when viewed from the optical axis direction and which is fixed to the fourth movable frame 6 by adhesion. Reference numeral 19 shows a magnetic circuit unit (third member) which includes a U-shaped yoke 19a opened to the front in the section of FIG. 2, a magnet 19b fixed to the inner side of the upper portion of the yoke 19a by adhesion, and a yoke 19c fixed to the front end of the yoke 19a to close the magnetic circuit. The air-core coil 18 and the magnetic circuit unit 19 constitute a focus actuator which moves the fourth lens unit L4 (fourth movable frame 6) in the optical axis direction.

The magnet 19b is polarized in its thickness direction, and generates magnetic flux in parallel with the sheet of FIG. 2 toward the optical axis AXL direction in space between it and the air-core coil 18 in the magnetic circuit. The wire of the air-core coil 18 is wound in a pushing direction perpendicular to the sheet of FIG. 2 inside the yoke 19a. The wire is wound in the opposite direction outside (below) the yoke 19a. When electric current is passed through the air-core coil 18 to generate magnetic flux there, that magnetic flux interacts with the magnetic flux generated in the magnetic circuit unit 19 to produce force in the optical axis direction in the air-core coil 18.

As shown in FIG. 1, the air-core coil 18 fixed to the four movable frame 6 by adhesion is put on the yoke 19a before attachment of the yoke 19c to the yoke 19a. Thereafter, the yoke 19c is attached to the yoke 19a to close the magnetic circuit.

A female screw hole 19d is formed in the upper portion of the yoke 19a. A screw 31 passes through the second connecting sheet metal 10 and a screw hole 7b formed in the rear barrel 7 and then is fitted into the female screw hole 19d to secure the second connecting sheet metal 10, the rear barrel 7, and the magnetic circuit unit 19 together.

Reference numeral 20 shows an optical scale having an optically regular pattern formed thereon in a longitudinal direction. The optical scale 20 is fixed to the fourth movable frame 6 by adhesion such that its longitudinal direction extends in parallel with the optical axis direction.

Reference numeral 21 shows an optical head which is fixed to the rear barrel 7 by screws to face the optical scale 20. A luminous flux is projected from the optical head 21 and reflected by the pattern on the optical scale 20 to form a regular pattern of light and dark on a plurality of light-receiving elements provided for the optical head 21. Electric signals from the plurality of light-receiving elements can be processed to provide a displacement signal as a sinusoidal wave having two phases with a phase difference of 90 degrees. The displacement signal can be used to determine a relative movement amount and a relative movement direction of the optical scale 20 and the optical head 21 in the optical axis direction. However, the displacement signal is a repetition signal and the absolute position cannot be determined from the signal.

Thus, when the power of the video camera is turned on, the four movable frame 6 is pushed against the rear-side fixed barrel 7 to provide the initial position, and subsequent changes in the displacement signal are detected to determine the absolute position.

Next, how to connect the first barrel 1 and the front-side fixed barrel 2 with the first connecting sheet metal 3 will be described with reference to FIGS. 3A, 3B, 4A, and 4B.

Figure 3A:
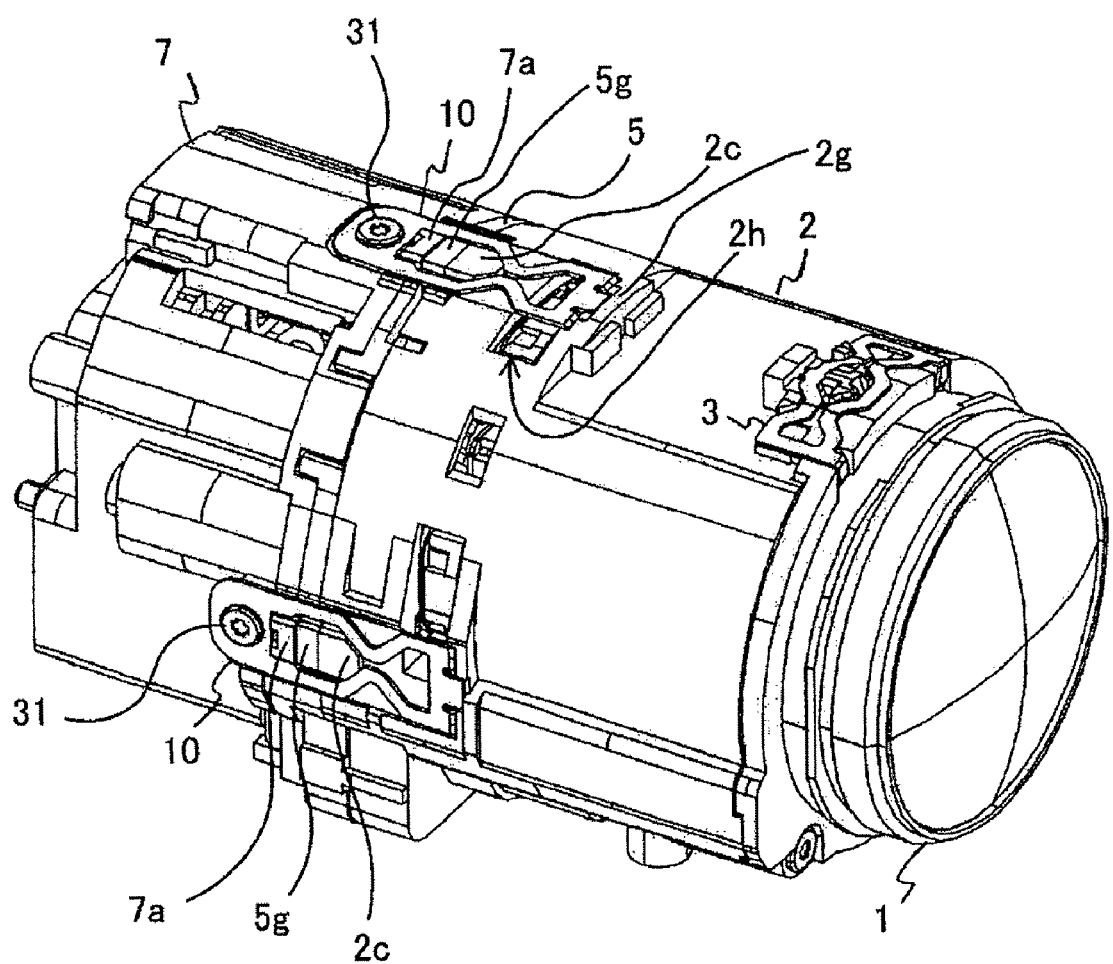
FIG. 3A is a perspective view for explaining connection in the lens barrel portion of the embodiment with a first connecting member and a second connecting member (showing the lens barrel portion before the connection).
Figure 3B:
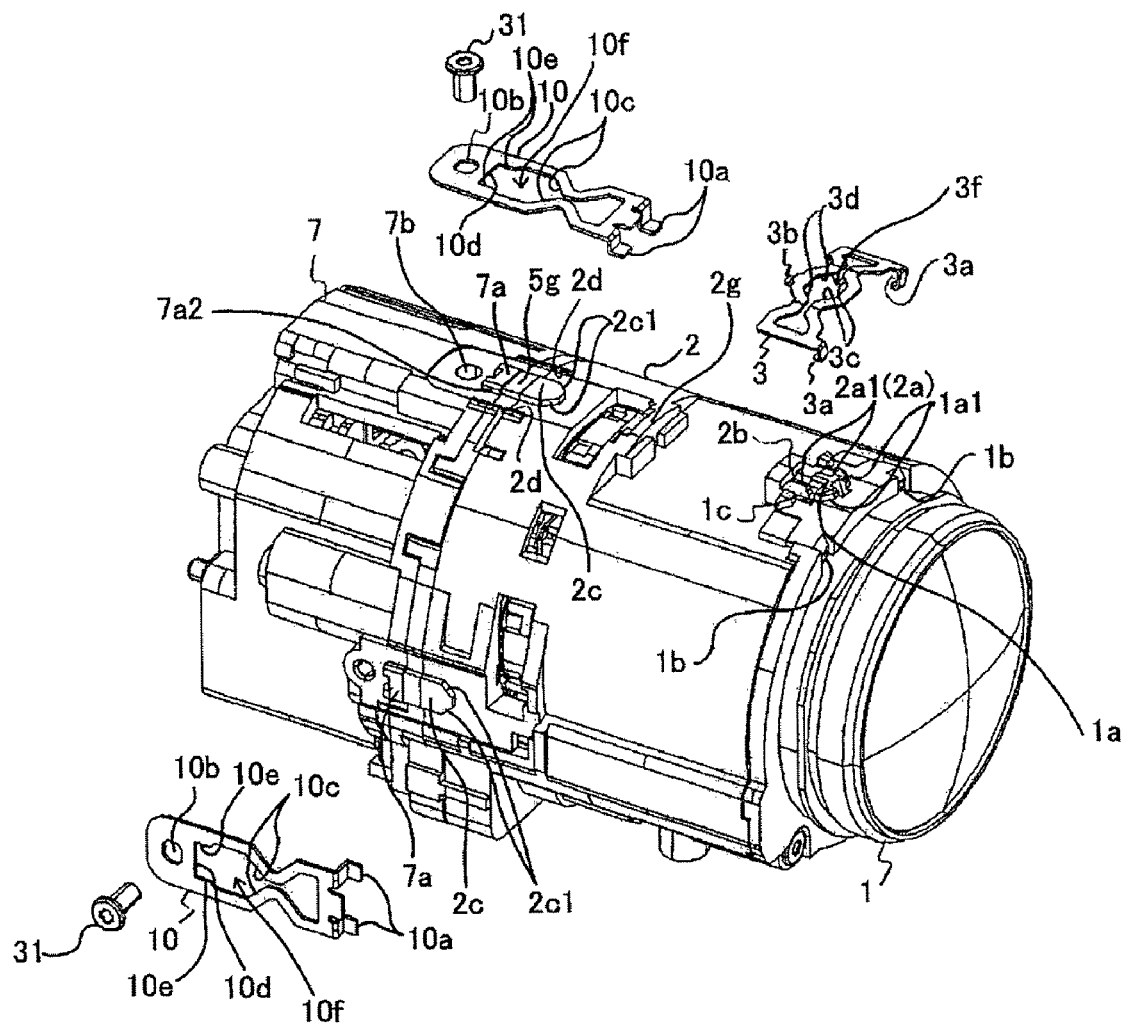
FIG. 3B is a perspective view for explaining connection in the lens barrel portion of the embodiment with the first and second connecting members (showing the lens barrel portion after the completion of the connection).
Figure 4A:
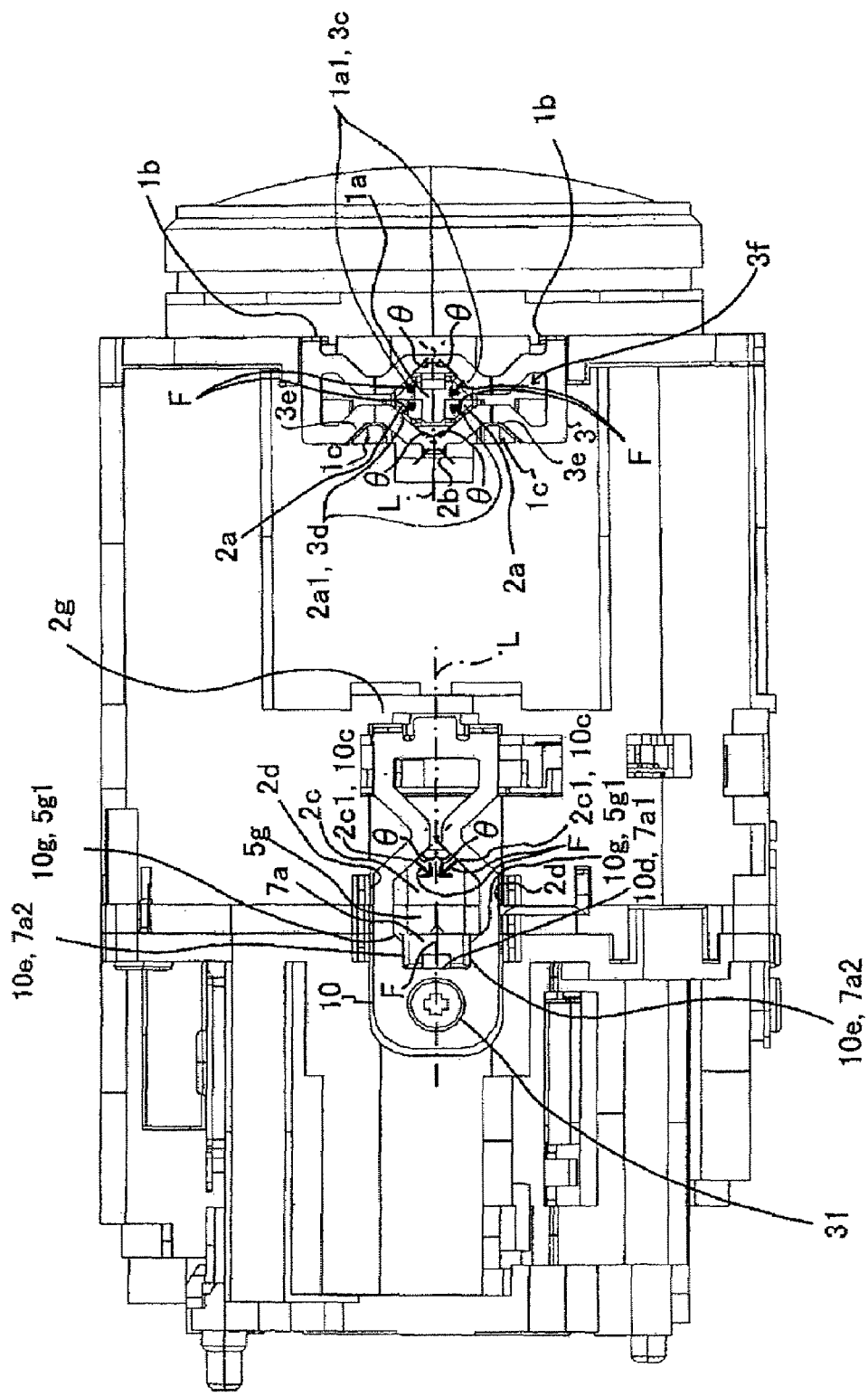
FIG. 4A is a plane view for explaining connection in the lens barrel portion of the embodiment with the first and second connecting members.

FIGS. 3A and 3B are perspective views for explaining the abovementioned connection of the first and second members with the first connecting sheet metal 3 and the second connecting sheet metal 10. FIG. 3A is an exploded perspective view showing the connecting sheet metals 3 and 10 after attachment, while FIG. 3B is an exploded perspective view showing the connecting members 3 and 10 before attachment. FIG. 4A is a plan view showing the connecting members 3 and 10 after attachment.

The first connecting sheet metal 3 is formed by stamping and bending of a metal sheet (plate), for example a phosphor bronze plate for spring, and is gently bent with the same curvature as those of the outer circumferences of the first barrel 1 and the front-side fixed barrel 2. The first connecting sheet metal 3 is attached to the first barrel 1 and the front-side fixed barrel 2 along their upper surfaces of the outer circumferences to pull them in and connect them in the optical axis direction. The direction in which the first barrel 1 and the front-side fixed barrel 2 are pulled in will hereinafter be referred to as a pulling direction.

The first connecting sheet metal 3 includes hook portions 3a and 3b on the front and rear ends that serve as removal preventing portions which extend from the outer circumferences of the first barrel 1 and the front-side fixed barrel 2 to the inner sides thereof to prevent the first connecting sheet metal 3 from coming off the first barrel 1 and the front-side fixed barrel 2, also shown in FIG. 2.

A single opening 3f is formed inside the first connecting sheet metal 3. The opening 3f can be formed in one punching in stamping and thus can be provided with high form accuracy.

A pair of oblique surfaces 3c is formed on the front edge of the opening 3f, and a pair of oblique surfaces 3d is formed on the rear edge. As shown in FIG. 4A, the paired oblique surfaces 3c and the paired oblique surfaces 3d are inclined the same angle θ with respect to an axis L extending in the pulling direction such that they provide a pair of oblique surfaces symmetric with respect to the axis L.

On the other hand, the first barrel 1 and the front-side fixed barrel 2 have protruding portions 1a and 2a, respectively, formed on their outer circumferences such that the protruding portions 1a and 2a are combined in the optical axis direction to be inserted into the opening 3f of the first connecting sheet metal 3. The protruding portion 1a has a pair of oblique surfaces 1a1 on the front side that can abut on the pair of oblique surfaces 3c of the first connecting sheet metal 3, while the protruding portion 2a has a pair of oblique surfaces 2a1 on the rear side that can abut on the pair of oblique surfaces 3d of the first connecting sheet metal 3. The paired oblique surfaces 1a1 and 2a1 are inclined the same angle θ with respect to the axis L such that they provide a pair of oblique surfaces symmetric with respect to the axis L.

The dimension in the direction of the axis L between the oblique surfaces 3c and 3d of the first connecting sheet metal 3 is smaller than the dimension in the axis L direction between the oblique surfaces 1a1 of the protruding portion 1a and the oblique surfaces 2a1 of the protruding portion 2a. Thus, when the first connecting sheet metal 3 is attached to the first barrel 1 and the front-side fixed barrel 2 by inserting the protruding portions 1a and 2a into the opening 3f, the first connecting sheet metal 3 is elastically deformed to expand in the axis L direction.

Figure 4B:
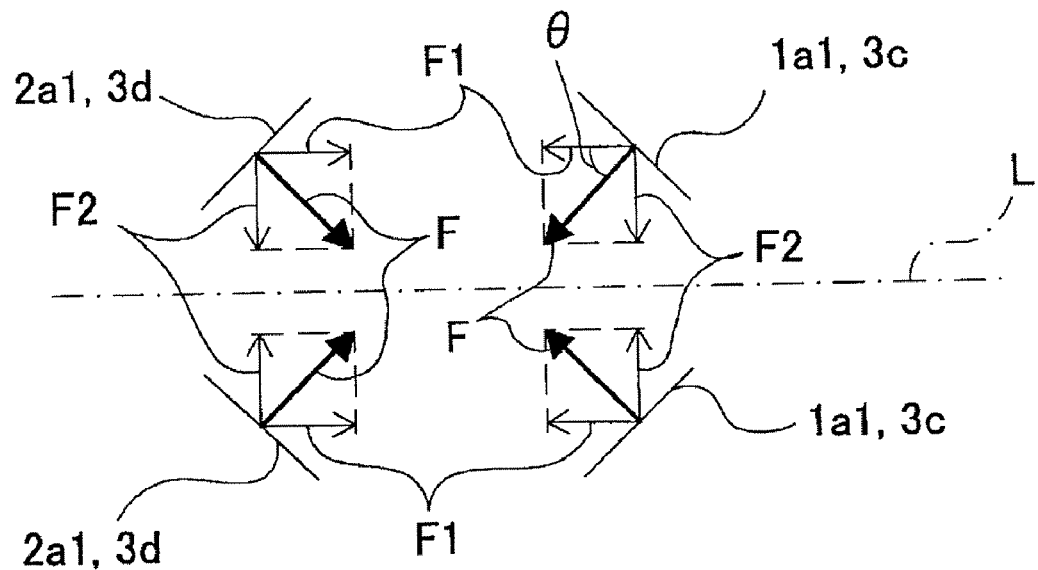
FIG. 4B is a schematic diagram for explaining elastic force which acts from the first connecting member in the lens barrel portion of the embodiment.

As enlarged in FIG. 4B, the elastic force (restoring force) F produced in the first connecting sheet metal 3 through the elastic deformation acts from the oblique surfaces 3c and 3d to the protruding portions 1a and 2a via the oblique surfaces 1a1 and 2a1. Since the direction of the elastic force F is inclined the angle θ with respect to the axis L (pulling direction), a component force of the elastic force F in the axis L direction acts as a force F1 which pulls the protruding portions 1a and 2a in, that is, pulls the first barrel 1 and the front-side fixed barrel 2 in. The pulling force F1 connects the first barrel 1 and the front-side fixed barrel 2 in the optical axis direction.

A component force F2 of the elastic force F in a direction orthogonal to the axis L acts to reduce relative displacement of the protruding portions 1a and 2a in that direction. Thus, the first barrel 1 and the front-side fixed barrel 2 are connected together without decentering.

When the first connecting sheet metal 3 is attached to the first barrel 1 and the front-side fixed barrel 2, the hook portion 3b on the rear side of the first connecting sheet metal 3 is first put and caught on the inner side of a hood portion 2b (see FIG. 2) of the front-side fixed barrel 2. Next, the opening 3f is expanded in the axis L direction by a jig, and the protruding portions 1a and 2a are inserted into the opening 3f and the hook portion 3a on the front side is put and caught on the inner side of a hood portion 1b of the first barrel 1. In this manner, the first connecting sheet metal 3 is prevented from coming off the first barrel 1 and the front-side fixed barrel 2.

A pair of protruding portions 1c serving as a deformation limiting portion is provided on both sides of the axis L at the rear of the protruding portion 1a of the first barrel 1 in the optical axis (axis L) direction. A rear portion 3e of the first connecting sheet metal 3 is inserted between the protruding portions 1c and the protruding portion 2a of the front-side fixed barrel 2. When normal attachment is made, the protruding portions 1c are spaced from the rear portion 3e of the first connecting sheet metal 3 in the axis L direction. If an external force is applied to the first barrel 1 and the front-side fixed barrel 2 in a direction in which they are pulled apart in the optical axis direction, the first connecting sheet metal 3 is elastically deformed in a direction in which the opening 3f is slightly expanded. However, the rear portion 3e of the first connecting sheet metal 3 abuts on the protruding portions 1c to prevent further deformation of the first connecting sheet metal 3.

As a result, the first barrel 1 and the front-side fixed barrel 2 connected together cannot be pulled apart in the optical axis direction.

Next, how to connect the front-side fixed barrel 2, the image stabilization unit 5, and the rear-side fixed barrel 7 with the second connecting sheet metal 10 will be described with reference to FIGS. 3A, 3B, 4A, and 4B.

The second connecting sheet metal 10 is formed by stamping and bending of a metal sheet, for example a phosphor bronze plate for spring, similarly to the first connecting sheet metal 3. The second connecting sheet metal 10 is attached to the front-side fixed barrel 2, the image stabilization unit 5, and the rear-side fixed barrel 7 along their outer circumferences. Thus, the front-side fixed barrel 2 and the rear-side fixed barrel 7 are pulled in and connected in the optical axis direction with the image stabilization unit 5 placed between them. The direction in which the front-side fixed barrel 2 and the rear-side fixed barrel 7 are pulled in will hereinafter be referred to as a pulling direction.

In the present embodiment, the two second connecting sheet metals 10 are attached to the top surface and the side surface of the front-side fixed barrel 2 and the rear-side fixed barrel 7. Since the two second connecting sheet metals 10 have the same shape, one of the second connecting sheet metals 10 will hereinafter be described.

The second connecting sheet metal 10 includes a hook portion 10a on the front end that serves as a removal preventing portion which extends from the outer circumference of the front-side fixed barrel 2 to the inner side thereof to prevent the second connecting sheet metal 10 from coming off the front-side fixed barrel 2, also shown in FIG. 2. The second connecting sheet metal 10 has a screw hole 10b as a removal preventing portion formed in its rear end portion. The abovementioned screw 31 is inserted into the screw hole 10b for securing to thereby prevent the second connecting sheet metal 10 from coming off the rear-side fixed barrel 7. The second connecting sheet metal 10 is formed to have a flat plate shape other than the hook portion 10a.

A single opening 10f is formed in an intermediate portion of the second connecting sheet metal 10 in the optical axis direction. The opening 10f can be formed in one punching in stamping and thus can be provided with high form accuracy.

A pair of oblique surfaces 10c is formed on the front edge of the opening 10f. As shown in FIG. 4A, the paired oblique surfaces 10c are inclined the same angle θ with respect to an axis L extending in the pulling direction such that they provide a pair of oblique surfaces symmetric with respect to the axis L. A surface 10d orthogonal to the axis L is formed on the rear end of the edge of the opening 10f. A pair of surfaces 10e is formed to extend in parallel with the axis L on both sides of the axis L on the rear edge of the opening 10f.

On the other hand, the front-side fixed barrel 2, the image stabilization unit 5, and the rear-side fixed barrel 7 have the protruding portions 2c, 5g, and 7a, respectively, formed on their outer circumferences such that the protruding portions 2c, 5g, and 7a are combined in the optical axis direction to be inserted into the opening 10f of the second connecting sheet metal 10. The protruding portion 2c has a pair of oblique surfaces 2c1 on the front side that can abut on the pair of oblique surfaces 10c of the second connecting sheet metal 10. The paired oblique surfaces 2c1 are also inclined the same angle θ with respect to the axis L such that they provide a pair of oblique surfaces symmetric with respect to the axis L. The protruding portion 7a has a surface 7a1 on the rear side that can abut on the surface 10d of the second connecting sheet metal 10. The protruding portion 7a has a pair of surfaces 7a2 extending in parallel with the axis L on both sides of the axis L that can abut on the paired surfaces 10e of the second connecting sheet metal 10.

The dimension in the axis L direction between the oblique surfaces 10c and the surface 10d of the second connecting sheet metal 10 is smaller than the dimension in the axis L direction between the oblique surfaces 2c1 of the protruding portion 2c and the surface 7a1 of the protruding portion 7a with the protruding portion 5g of the image stabilization unit 5 placed between them. Thus, when the second connecting sheet metal 10 is attached to the front-side fixed barrel 2 and the rear-side fixed barrel 7 by inserting the protruding portions 2c, 5g, and 7a into the opening 10f, the second connecting sheet metal 10 is elastically deformed to expand in a direction in parallel with the sheet of FIG. 4A of directions orthogonal to the axis L.

Figure 4C:
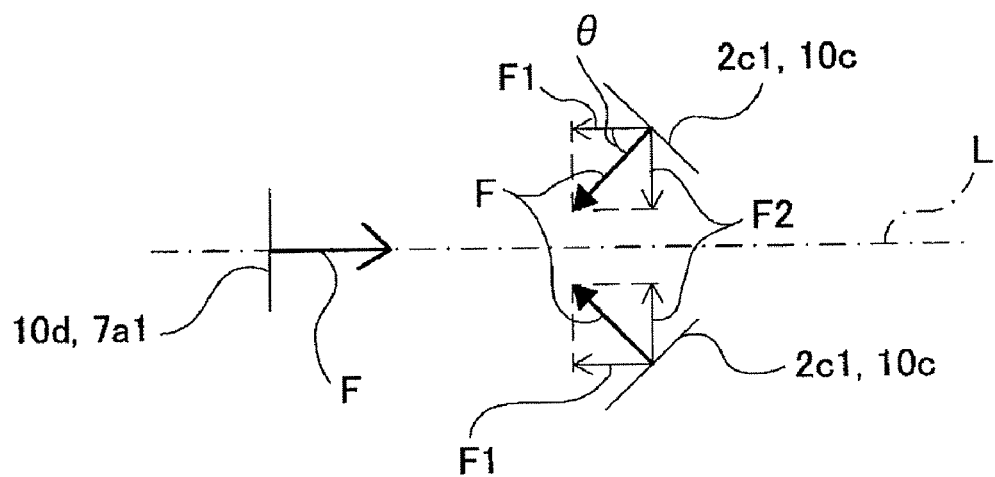
FIG. 4C is a schematic diagram for explaining elastic force which acts from the second connecting member in the lens barrel portion of the embodiment.

As enlarged in FIG. 4C, the elastic force (restoring force) F produced in the second connecting sheet metal 10 through the elastic deformation acts from the oblique surface 10c and the surface 10d to the protruding portions 2c and 7a via the oblique surface 2c1 and the surface 7a1. Since the direction of the elastic force F acting on the protruding portion 2c is inclined the angle θ with respect to the axis L (pulling direction), a component force F1 of the elastic force F in the axis L direction pushes the protruding portion 2c rearward. On the other hand, the elastic force F of the second connecting sheet metal 10 acts on the protruding portion 7a forward in the axis L direction via the surfaces 10d and 7a1. Thus, the front-side fixed barrel 2 and the rear-side fixed barrel 7 are connected together in the optical axis direction such that they are pulled in with the image stabilization unit 5 placed between them.

A component force F2 of the elastic force F acting on the protruding portion 2c in a direction orthogonal to the axis L acts to reduce relative displacement of the protruding portion 2c in that direction to the protruding portion 7a with the paired surfaces 7a2 abutting on the paired surfaces 10e of the second connecting sheet metal 10. An interior angle portion 10g in front of the paired surfaces 10e of the second connecting sheet metal 10 abuts on an angle portion 5g1 at the rear of the protruding portion 5g of the image stabilization unit 5 to reduce relative displacement of the protruding portions 2c and 5g in a direction orthogonal to the axis L. Thus, the front-side fixed barrel 2, the image stabilization unit 5, and the rear-side fixed barrel 7 are connected together without decentering.

When the second connecting sheet metal 10 is attached to the front-side fixed barrel 2 and the rear-side fixed barrel 7, the hook portion 10a on the front of the second connecting sheet metal 10 is first put and caught on the inner side of a hood portion 2g (see FIG. 2) of the front-side fixed barrel 2. Next, the opening 10f is expanded in the axis L direction by a jig, and the protruding portions 2c, 5g, and 7a are inserted into the opening 10f. The screw 31 passing through the screw 10b is inserted into the screw hole 7b formed in the rear-side fixed barrel 7, and then fitted into the female screw hole 19d formed in the yoke 19a. In this manner, the second connecting sheet metal 10 is prevented from coming off the front-side fixed barrel 2 and the rear-side fixed barrel 7.

A pair of protruding portions 2d serving as a deformation limiting portion is provided at positions spaced from the protruding portion 2c of the front-side fixed barrel 2 in a direction orthogonal to the axis L. The side portions of the second connecting sheet metal 10 are inserted between the protruding portions 2c and 2d. When normal attachment is made, the protruding portions 2*d* are spaced from the side portions of the second connecting sheet metal 10 in a direction orthogonal to the axis L direction. If an external force is applied to the front-side fixed barrel 2 and the rear-side fixed barrel 7 in a direction in which they are pull apart in the optical axis direction, the second connecting sheet metal 10 is elastically deformed slightly such that the opening 10*f* is expanded in a direction orthogonal to the axis L. However, the side portions of the second connecting sheet metal 10 abut on the protruding portions 2*d* to prevent further deformation of the second connecting sheet metal 10.

As a result, the front-side fixed barrel 2 and the rear-side fixed barrel 7 connected together cannot be pulled apart in the optical axis direction.

Figure 5:
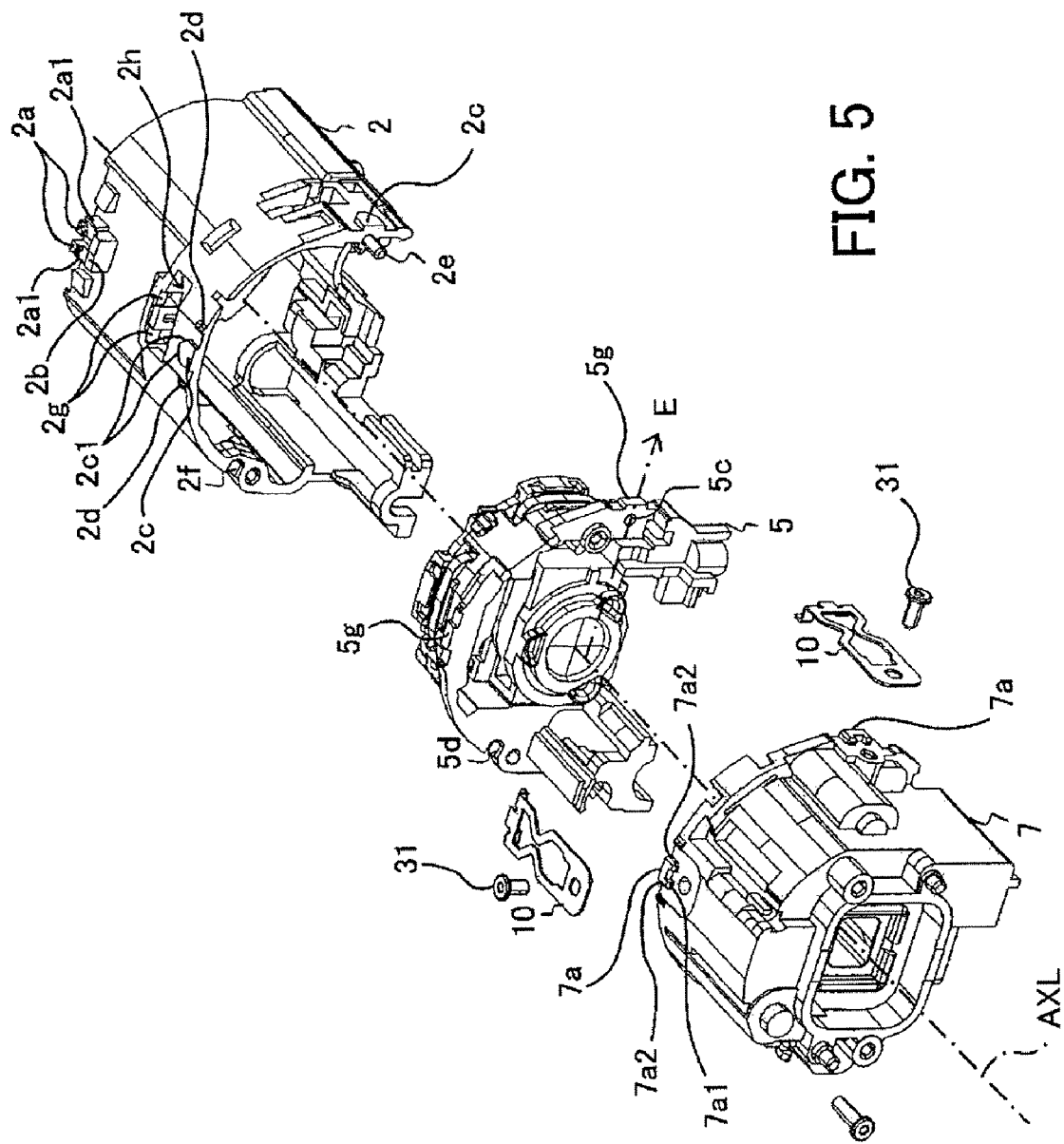
FIG. 5 is an exploded perspective view showing the lens barrel portion of the embodiment when viewed from the back.

Next, description will be made of how to position the front-side fixed barrel 2, the fixed portion 5*b* of the image stabilization unit 5, and the rear-side fixed barrel 7 in a plane orthogonal to the optical axis with reference to FIGS. 1 and 5. FIG. 5 is an exploded perspective view showing the lens barrel portion when viewed from the rear.

In FIG. 5, reference numeral 2*e* shows a positioning pin provided for the rear end surface of the front-side fixed barrel 2. Reference numeral 5*c* shows a positioning hole formed in the fixed portion 5*b* of the image stabilization unit 5. In FIG. 1, reference numeral 7*d* shows a positioning hole formed in the rear-side fixed barrel 7. The positioning pin 2*e* is inserted into the positioning holes 5*c* and 7*d*.

In FIG. 1, reference numeral 7*c* shows a positioning pin provided for the rear-side fixed barrel 7 and placed on the opposite side of the optical axis AXL to the positioning hole 7*d*.

In FIG. 5, reference numeral 5*d* shows a positioning groove formed in the fixed barrel 5*b* of the image stabilization unit 5 on the opposite side the optical axis AXL to the positioning hole 5*c*. Reference numeral 2*f* shows a positioning groove formed in the rear end surface of the front-side fixed barrel 2 on the opposite side the optical axis AXL to the positioning pine 2*e*. The positioning pin 2*e* is inserted into the positioning holes 5*c* and 7*d* and the positioning pin 7*c* is inserted into the positioning grooves 5*d* and 2*f* to align the optical axis of the front-side fixed barrel 2, the fixed portion 5*b* of the image stabilization unit 5, and the rear-side fixed barrel 7, and in this state, the three barrel-constituting members are connected together by using one screw and the second connecting sheet metal 10.

A positioning engagement portion for the three barrel-constituting members that is formed of the positioning pine 2*e* and the positioning holes 5*c* and 7*d* is provided in the same direction E as the attachment area (the protruding portions 2*c*, 5*g*, and 7*a*) of the second connecting sheet metal 10 on the side of the lens barrel portion when viewed from the optical axis AXL, that is, at the same phase angle. In other words, the positioning engagement portion (positioning structure) is provided on the inner side of the attachment area for the second connecting sheet metal 10 (closer to the optical axis AXL). When the lens barrel portion is viewed from the optical axis direction, a screwing portion including the inserted screw 31 for preventing removal of the rear portion of the second connecting sheet metal 10 and the abovementioned positioning engagement portion overlap in the optical axis direction.

In other words, the positioning engagement portion, the attachment area for the second connecting sheet metal 10, and the screwing portion are provided at the same phase angle around the optical axis and are shifted in position in the optical axis direction to significantly reduce the space for placing them and to achieve the positioning and connection of the three barrel-constituting members.

Figure 6:
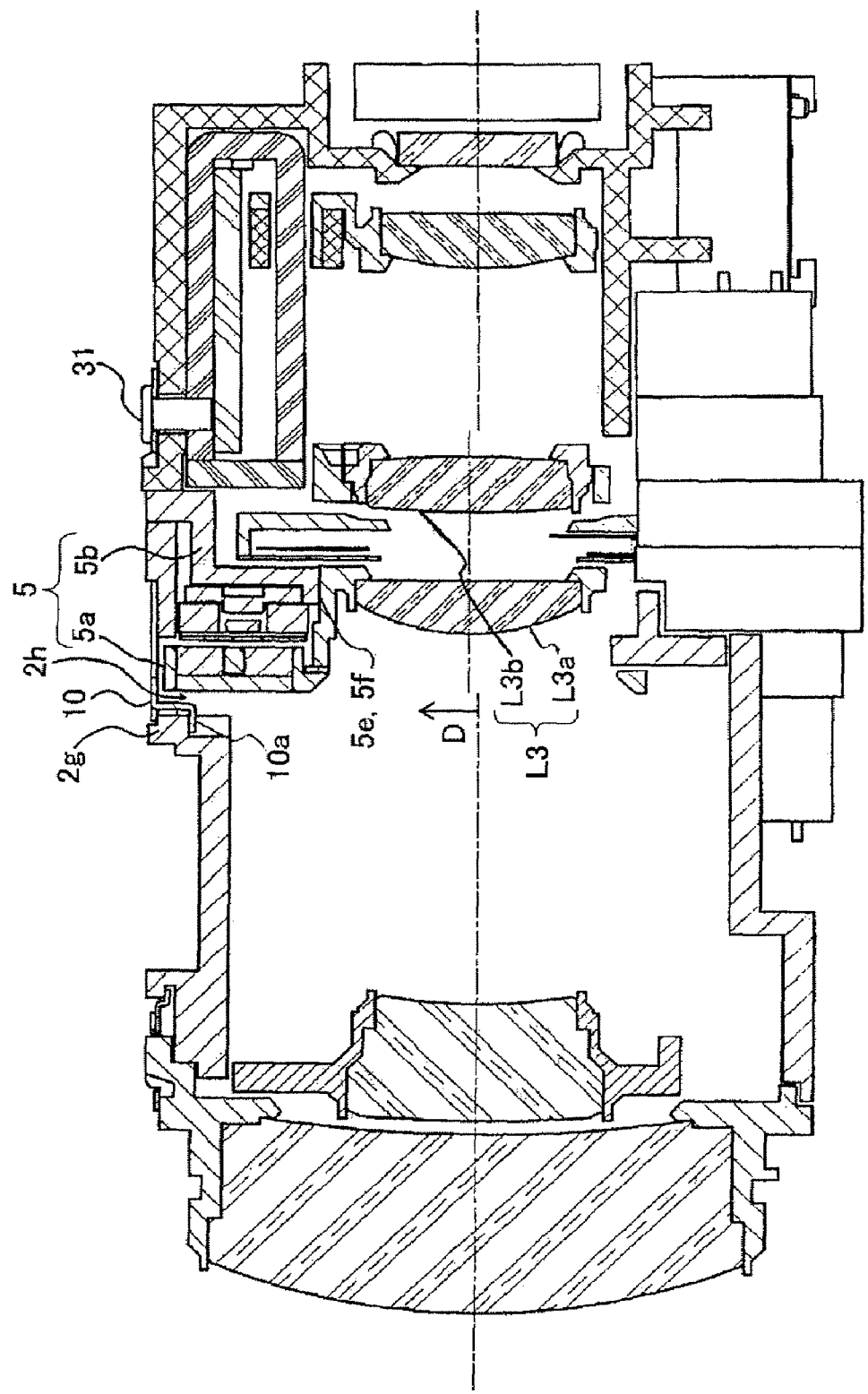
FIG. 6 is a section view showing the lens barrel portion of the embodiment (with an image stabilization unit shifted).

Next, the relationship between the removal preventing structure for the second connecting sheet metal 10 and the image stabilization unit 5 will hereinafter be described with reference to FIGS. 2 and 6. FIG. 6 shows the movable portion 5*a* of the image stabilization unit 5 displaced to the movable end in the direction shown by an arrow D (the image stabilization unit 5 in the operational state) in contrast to FIG. 2.

In FIG. 2, a portion 5*e* of the fixed portion 5*b* of the image stabilization unit 5 is spaced from a portion 5*f* of the movable portion 5*a*. In FIG. 6, the portions 5*e* and 5*f* are in contact with each other. In FIG. 6, part of the movable portion 5*a* is inserted in an opening portion 2*h* (see FIGS. 1, 3A, and 5) formed in the front-side fixed barrel 2. The hook portion 10*a* on the front side and the screwing portion on the rear side that serve as the removal preventing structure for the second connecting sheet metal 10 always overlap with part of the image stabilization unit 5 (especially the movable portion 5*a*) when viewed from the optical axis direction.

In this manner, in the present embodiment, the front-side fixed barrel 2 is connected to the rear-side fixed barrel 7 with the image stabilization unit 5 placed therebetween, and the removal preventing structure for the second connecting sheet metal 10 is provided at the front and the rear of the second connecting sheet metal 10 in the optical axis direction. This significantly reduces the space for connecting of the three barrel-constituting members with the second connecting sheet metal 10 and the prevention of removal of the second connecting sheet metal 10. Especially, the movable portion 5*a* of the image stabilization unit 5 is inserted in the opening portion 2*h* of the front-side fixed barrel 2 to allow the effective use of the space.

Next, description will be made of how to connect the zoom motor 16 (motor support plate 16*b*), the front-side fixed barrel 2, and the fixed portion 5*b* of the image stabilization unit 5 with the motor connecting sheet metal 17 with reference to FIGS. 7A, 7B, and 8.

Figure 7A:
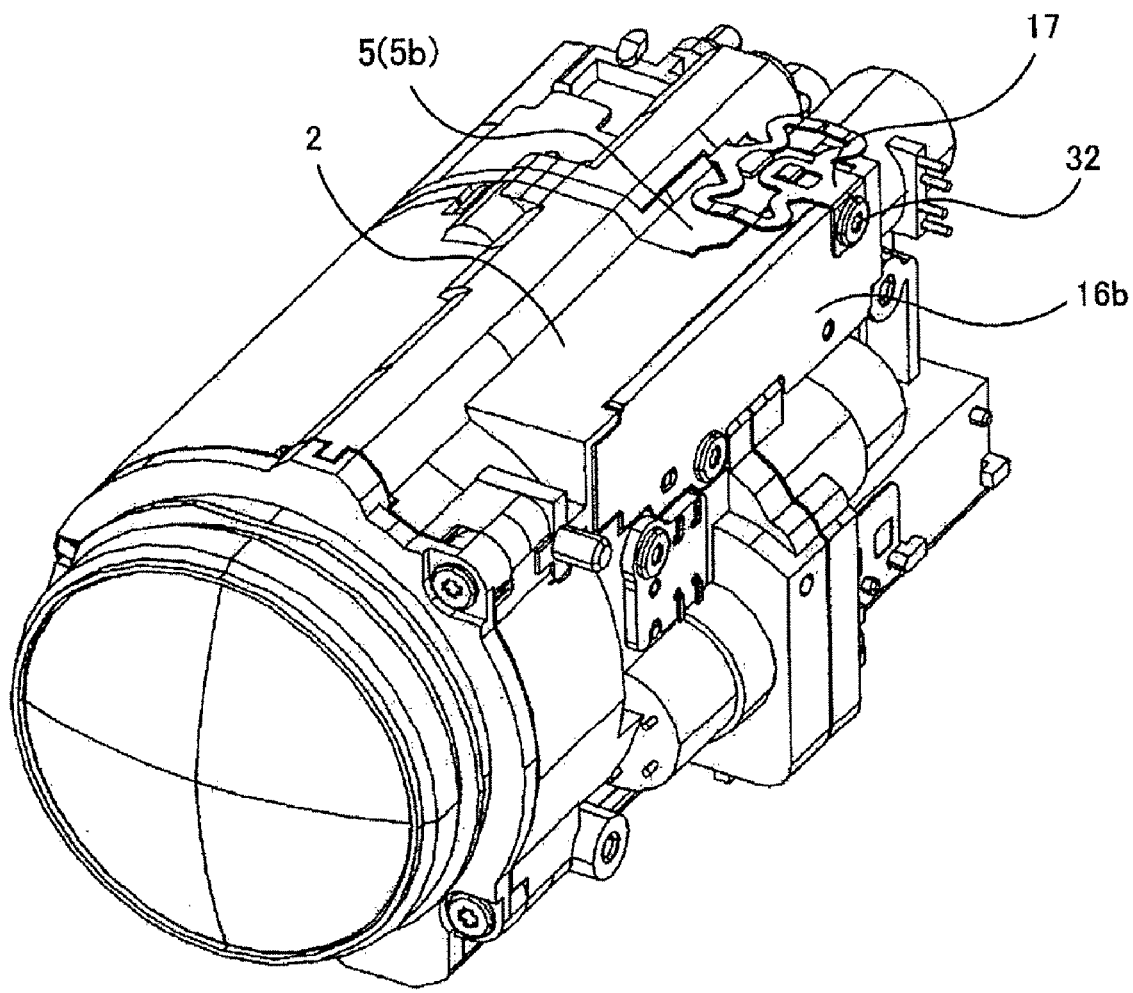
FIG. 7A is a perspective view for explaining connection in the lens barrel portion of the embodiment with a motor connecting member (showing the lens barrel portion after the completion of the connection).
Figure 7B:
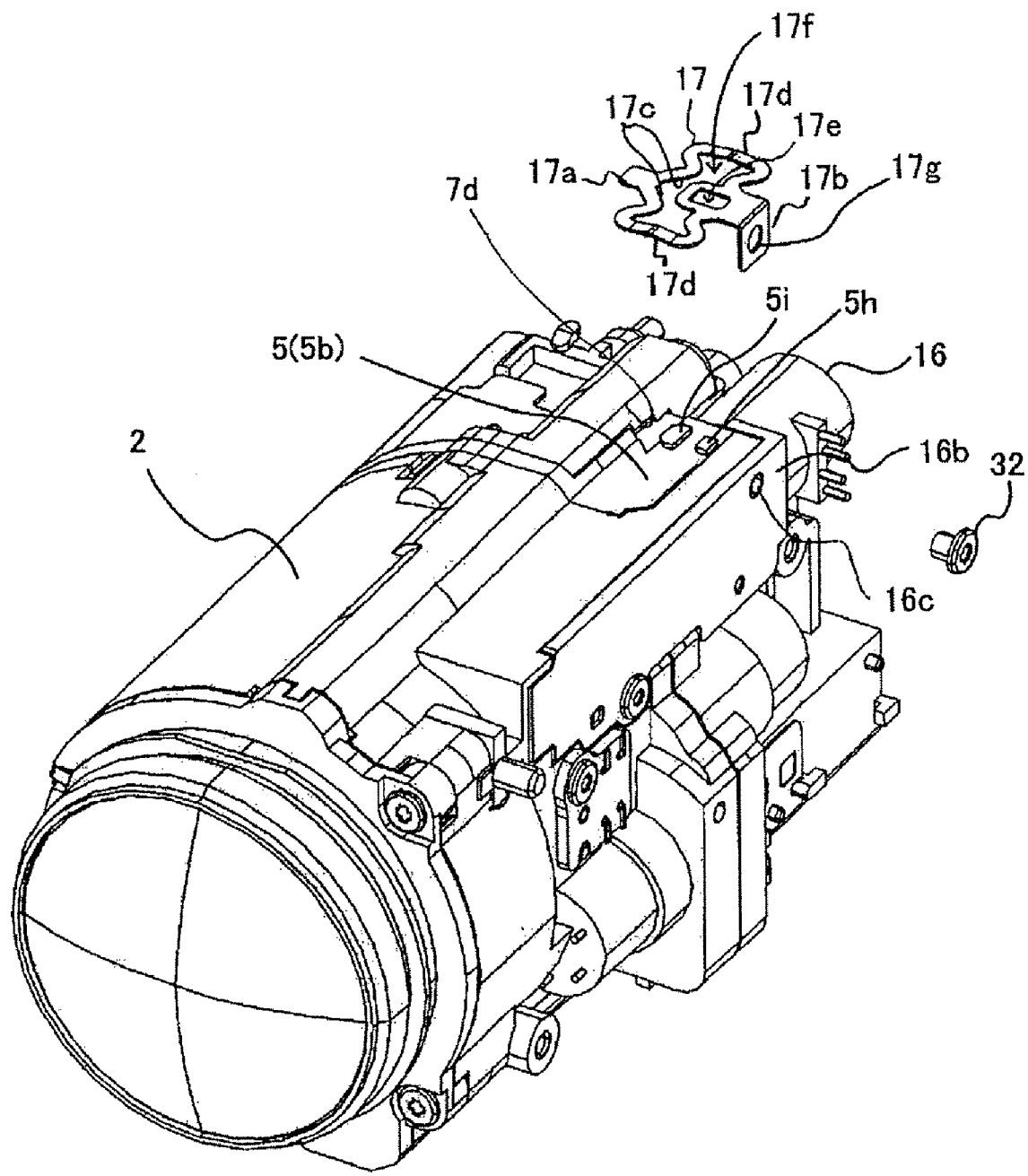
FIG. 7B is a perspective view for explaining connection in the lens barrel portion of the embodiment with the motor connecting member (showing the lens barrel portion before the connection).
Figure 8:
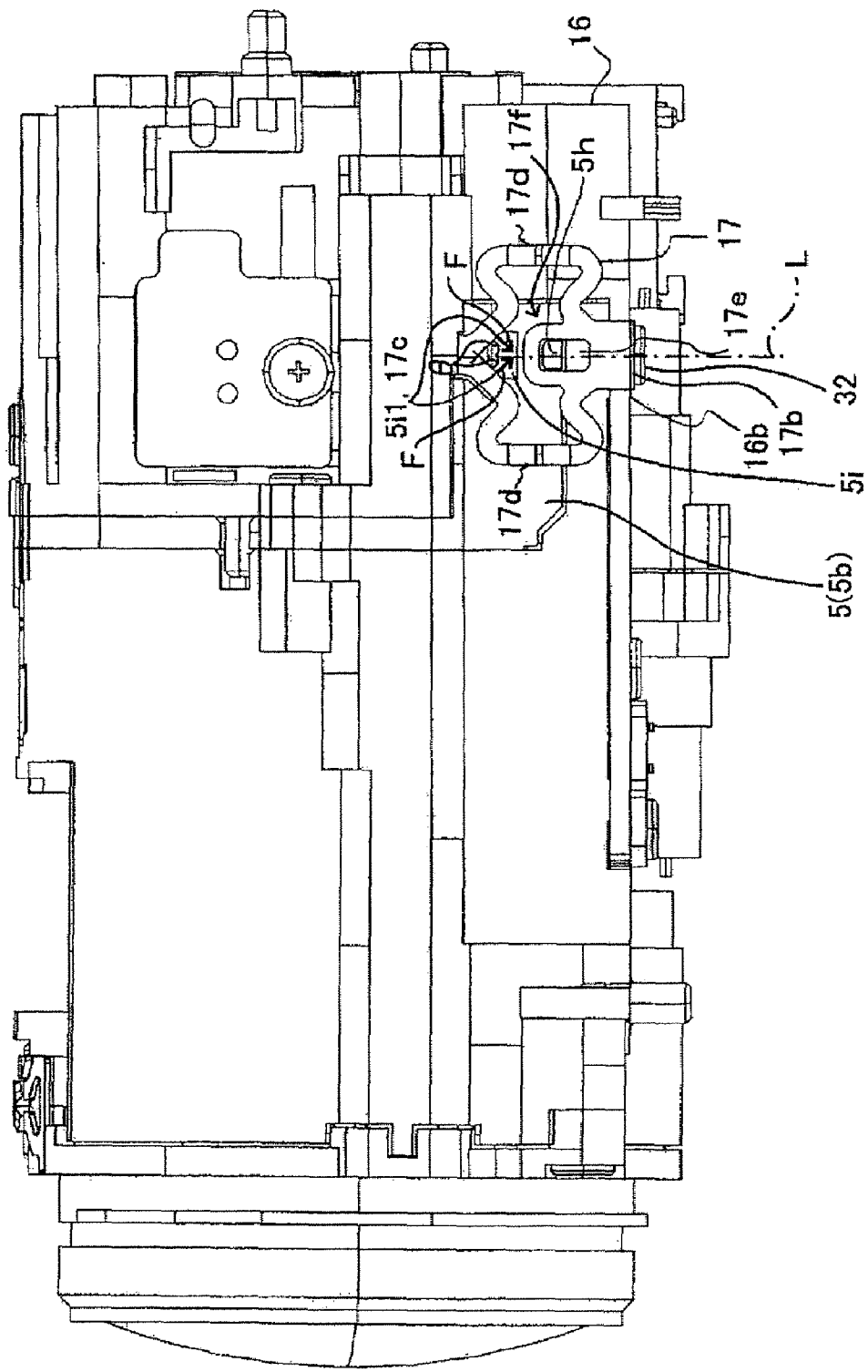
FIG. 8 is a plan view for explaining connection in the lens barrel portion of the embodiment with the motor connecting member.

FIGS. 7A and 7B are perspective views showing how to attach the motor connecting sheet metal 17. FIG. 7A shows the motor connecting sheet metal 17 after the attachment. FIG. 7B shows the motor connecting sheet metal 17 before the attachment. FIG. 8 is a plan view showing the motor connecting sheet metal 17 after the attachment. The zoom motor 16 is fixed to the front-side fixed barrel 2, and the motor connecting sheet metal 17 pulls the motor support plate 16*b* and the fixed portion 5*b* of the image stabilization unit 5 with part of the front-side fixed barrel 2 sandwiched therebetween. The direction in which the motor support plate 16*b* and the fixed portion 5*b* of the image stabilization unit 5 are pulled in will hereinafter be referred to as a pulling direction.

The motor connecting sheet metal 17 is formed by stamping and bending of a metal sheet, for example a phosphor bronze plate for spring, similarly to the first and second connecting sheet metals 3 and 10. The motor connecting sheet metal 17 includes a hook portion 17*a* at one end in the pulling direction to prevent the motor connecting sheet metal 17 from coming off the fixed portion 5*b*. The motor connecting sheet 17 includes a bend portion 17*b* bent 90 degrees with respect to the pulling direction at the other end in the pulling direction. The bend portion 17*b* has a screw hole 17*g* formed therein. A screw 32 is inserted thereinto and is fitted into a female screw portion 16*c* formed in the motor support plate 16*b* to prevent the motor connecting sheet metal 17 from coming off the motor support plate 16*b*. The motor connecting sheet metal 17 is formed to have a flat plate shape other than the hook portion 17*a* and the bend portion 17*b*.

A single opening 17*f* is formed in an intermediate portion of the motor connecting sheet metal 17. The opening 17*f* can be formed in one punching in stamping and thus can be provided with high form accuracy.

A pair of oblique surfaces 17c is formed closer to the abovementioned one end on the edge of the opening 17f. As shown in FIG. 8, the paired oblique surfaces 17c are inclined the same angle θ with respect to the axis L extending in the pulling direction such that they provide a pair of oblique surfaces symmetric with respect to the axis L.

The motor connecting sheet metal 17 includes a protruding portion which extends from the abovementioned other end toward the center of the opening 17f. An opening 17e is formed in the protruding portion. A pair of connections 17d is provided on both sides of the axis L to connect the portion closer to the one end of the motor connecting sheet metal 17 to the portion closer to the other end.

The fixed portion 5b of the image stabilization unit 5 has a protruding portion 5i formed thereon. The protruding portion 5i includes a pair of oblique surfaces 5i symmetrical with respect to the axis L (oblique surfaces inclined the same angle θ with respect to the axis L).

The dimension in the axis L direction between the oblique surfaces 17c of the motor connecting sheet metal 17 and the bend portion 17b is smaller than the dimension in the axis L direction between the oblique surfaces 5i1 of the protruding portion 5i of the image stabilization unit 15 and the outer surface of the motor support plate 16. Thus, when the motor connecting sheet metal 17 is attached to the motor support plate 16b and the fixed portion 5b by causing the bend portion 17b to abut on the outer surface of the motor support plate 16b and inserting the protruding portion 5i into the opening 17f, the connections 17d are subjected to elastic deformation such as bending and twisting to expand the opening 17f in the axis L direction.

The elastic force (restoring force) F produced in the motor connecting sheet metal 17 through the elastic deformation acts from the oblique surface 17c and the bend portion 17b to the protruding portion 5i and the motor support plate 16b via the oblique surfaces 5i1 and the outer surface of the motor support plate 16b. Since the direction of the elastic force F acting on the protruding portion 5i is inclined the angle θ with respect to the axis L (pulling direction), a component force of the elastic force F in the axis L direction pushes the protruding portion 5i toward the motor support plate 16b. On the other hand, the elastic force F acts on the motor support plate 16b toward the protruding portion 5i in the axis L direction. Thus, the motor support plate 16b and the fixed portion 5b are connected in the axis L direction such that they are pulled in with part of the front-side fixed barrel 2 sandwiched between them.

A component force of the elastic force acting on the protruding portion 5i in a direction orthogonal to the axis L acts to reduce relative displacement of the fixed portion 5b and the motor support plate 16b in that direction.

When the motor connecting sheet metal 17 is attached to the motor support plate 16b and the fixed barrel 5b, the hook portion 17a of the motor connecting sheet metal 17 is first put and caught on the opening 7d (see FIG. 7B) formed in the rear-side fixed barrel 7. Next, the opening 17f is expanded in the optical axis direction by a jig, and the protruding portions 5i and 5h are inserted into the openings 17f and 17e, respectively, and the screw 32 inserted in the screw hole 17g is fitted into the female screw hole 16c formed in the motor support plate 16b. In this manner, the motor connecting sheet metal 17 is prevented from coming off the fixed barrel 5b and the motor support plate 16b.

The protruding portion 5h serving as a deformation limiting portion is provided in the fixed portion 5b of the image stabilization unit 5. The protruding portion 5h is inserted into the opening 17e of the motor connecting sheet metal 17. When normal attachment is made, the protruding portion 5h is spaced from the edge of the opening 17e in the axis L direction.

When an external force is applied to the zoom motor 16 in a direction in which it is pulled apart from the front-side fixed barrel 2, the connection 17d of the motor connecting sheet metal 17 is elastically deformed slightly to increase the interval between the oblique surfaces 17c and the bend portion 17b in the axis L direction. However, the protruding portion 5h abuts on the edge of the opening 17e to prevent further deformation.

The motor connecting sheet metal 17 formed in this manner can be used to stably fasten the zoom motor 16 to the front-side fixed barrel 2 while reducing the size of the protruding portion at the connection between the fixed portion 5b and the motor support plate 16b on the side of the lens barrel portion. The front-side fixed barrel 2, the fixed portion 5b of the image stabilization unit 5, and the zoom motor 16 can be connected together with the motor connecting sheet metal 17 to enhance the rigidity around that connection to provide an advantageous structure resistant to noise and vibration.

Figure 9:
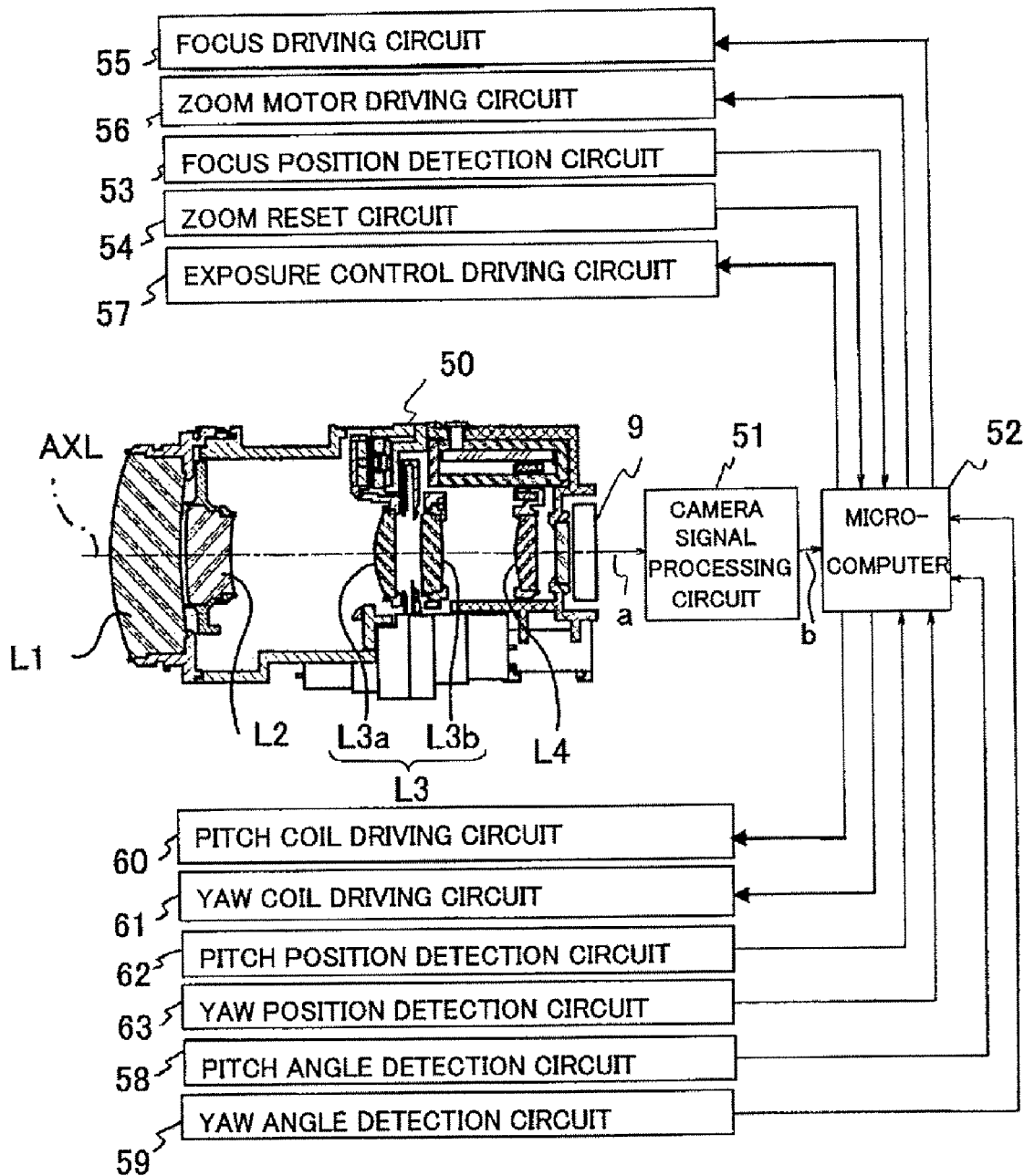
FIG. 9 is a block diagram showing the structure of an electric system in the lens barrel portion of the embodiment.

Next, the structure of the electric system of the video camera in the present embodiment will be described with reference to FIG. 9. A lens barrel portion 50 corresponds to the lens barrel portion described in FIGS. 1 to 8.

An optical image (object image) formed by the variable-magnification optical system in the lens barrel portion 50 is converted into an electric signal by the image-pickup device 9. An electric signal a read from the image-pickup device 9 is converted into an image signal b by a camera signal processing circuit 51. Reference numeral 52 shows a microcomputer for controlling the lens driving.

When the power is turned on, the microcomputer 52 drives the fourth lens unit L4 in the infinite direction through a focus driving circuit 55 while monitoring the output from a focus position detection circuit 53 until the fourth lens unit L4 reaches the movable end. The initial position of the fourth lens unit L4 is detected in this manner. The microcomputer 52 activates the zoom motor 16 shown in FIG. 1 and the like through a zoom motor driving circuit 56 to move the second lens unit L2 in the optical axis direction while monitoring the output from a zoom reset circuit 54. The output from the zoom reset circuit 54 is reversed when the light-shield portion 4b of the second movable frame 4 reaches the position of the photointerrupter 25. In this manner, the microcomputer 52 detects the initial position of the second lens unit L2.

The absolute position of the fourth lens unit L4 is determined by counting the output from the focus position detection circuit 53 from the initial position. The absolute position of the second lens unit L2 is determined by counting the number of driving steps of the zoom motor (stepping motor) 16 from the initial position by using the initial position as the reference. Thus, the microcomputer 52 can obtain accurate focus information and focal length information.

Reference numeral 57 shows an exposure control driving circuit for driving the light-amount adjustment unit 15. The circuit 57 controls the aperture diameter in the light-amount adjustment unit 15 and the insertion and removal of the ND filter 15e (see FIG. 2) based on bright information b of a video signal taken by the microcomputer 52. Reference numerals 58 and 59 show angle detection circuits which detect inclination angles of the video camera in a pitch direction (vertical direction) and a yaw direction (horizontal direction), respectively. The inclination angles are detected by integrating the outputs from an angular velocity sensor such as a vibration gyro. The outputs from the circuits 58 and 59, that is, the information about the inclination angle, are taken by the microcomputer 52.

Reference numerals 60 and 61 show a pitch coil driving circuit and a yaw coil driving circuit, respectively, for driving the third lens unit L3 held by the image stabilization unit 5 in a plane orthogonal to the optical axis. Each of the coil driving circuits 60 and 61 is formed in a so-called moving coil type by placing a coil provided for the movable portion 5a of the image stabilization unit 5 in a gap in a magnetic circuit including a magnet provided for the fixed portion 5b. The coil driving circuits 60 and 61 generate driving force for shifting the third lens unit L3 in a plane orthogonal to the optical axis.

Reference numerals 62 and 63 show a pitch position detection circuit and a yaw position detection circuit, respectively, for detecting the shift amount of the third lens unit L3 with respect to the optical axis. The outputs thereof are taken by the microcomputer 52.

When the third lens unit L3 is moved in the pitch or yaw direction with respect to the optical axis AXL, a luminous flux passing through the variable-magnification optical system is bent to change the position of the object image formed on the image-pickup device 9. Thus, the position of the third lens unit L3 is controlled such that the object image is moved by the same amount in the opposite direction to the movement of the object image due to the inclined video camera, thereby allowing correction of image shake due to the moved video camera.

The microcomputer 52 subtracts the shift amount signal of the third lens unit L3 provided by the pitch and yaw position detection circuits 62 and 63 from the inclination angle information provided by the pitch and yaw angle detection circuits 58 and 59 to produce a difference signal. Then, the microcomputer 52 performs amplification and appropriate phase correction on the difference signal, controls the pitch and yaw coil driving circuits 60 and 61 so as to reduce the value of the difference signal, and drives the third lens unit L3.

In the present embodiment, since variable magnification is provided by changing the relative interval between the first to third lens units L1 to L3, the moving amount of the object image relative to the shift amount of the third lens unit L3 depends on the focal length. Thus, in the present embodiment, the driving amount of the third lens unit L3 is corrected in accordance with the focal length information to achieve appropriate correction of image shake regardless of the focal length.

Figure 10:
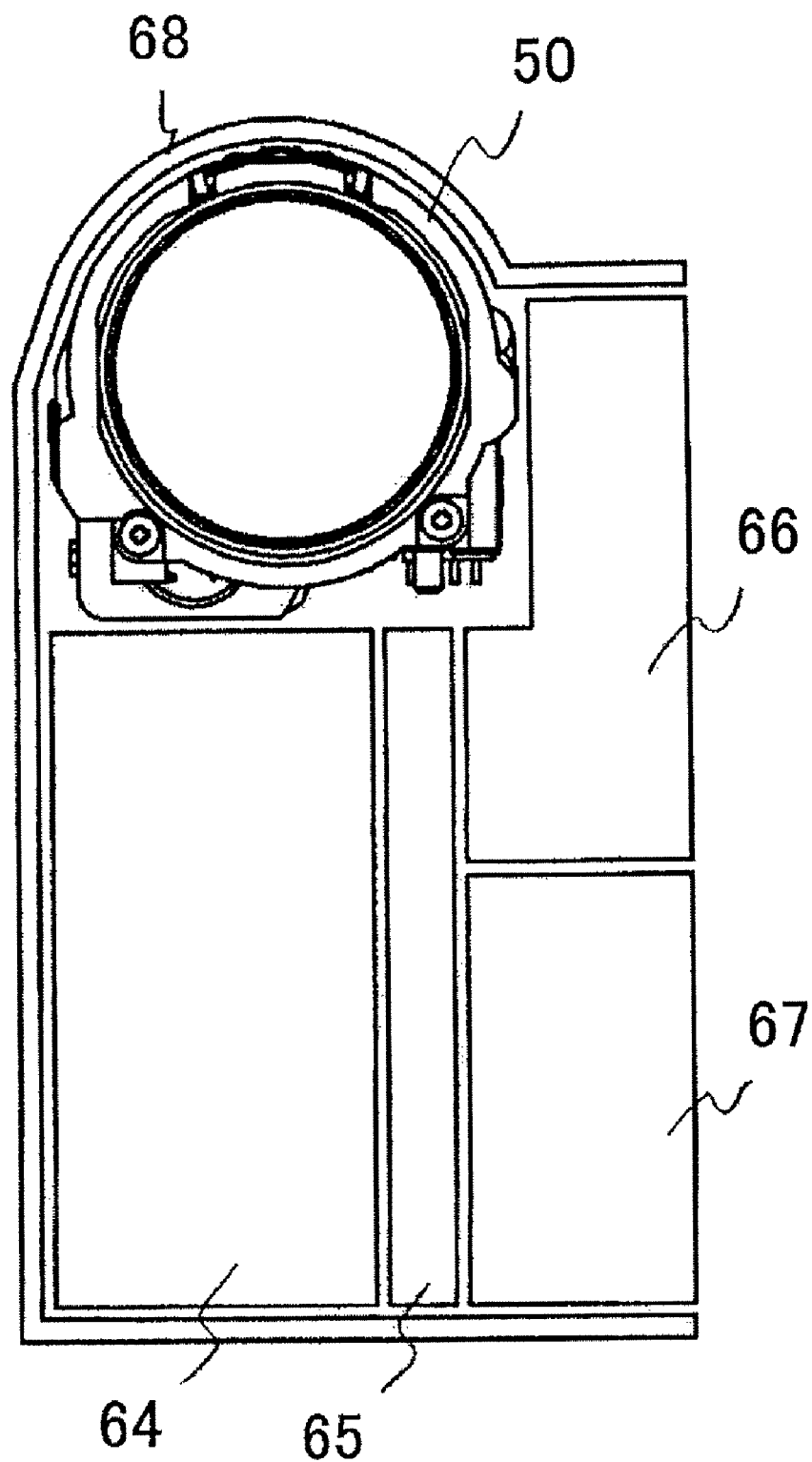
FIG. 10 is a schematic diagram showing the video camera of the embodiment.
Figure 11:
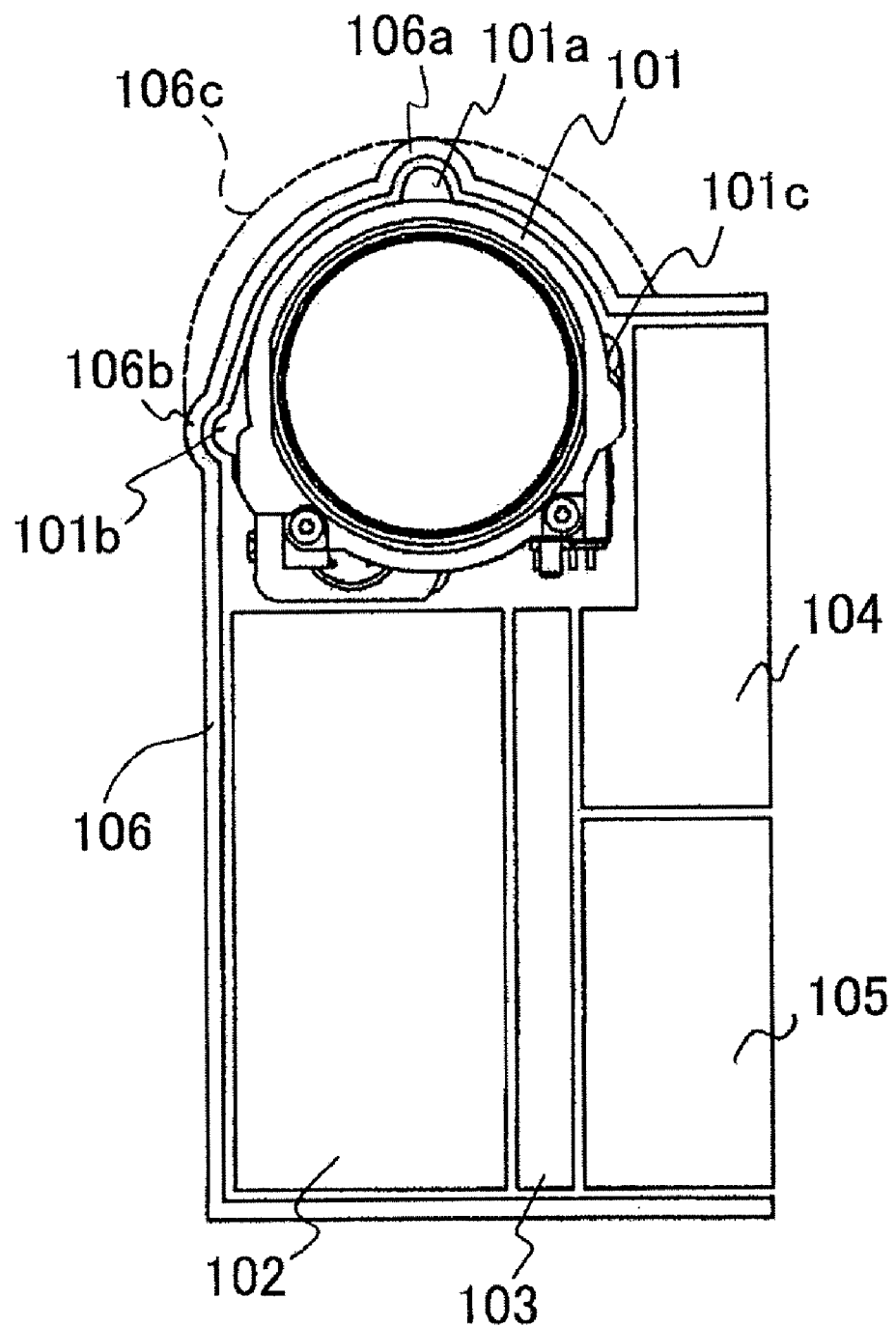
FIG. 11 is a schematic diagram showing a video camera in the prior art.

FIG. 10 is a front view showing a specific example of the structure of the video camera including the lens barrel portion 50 described above. Reference numeral 64 shows a recording/reproduction unit, 65 an electric substrate, 66 a liquid crystal display, 67 a battery, and 68 an external member.

In the lens barrel portion 50 of the present embodiment, the barrel-constituting members are connected by the first, second, and motor connecting members 3, 10, and 17 arranged along the outer surface of the lens barrel portion 50, so that the upward and sideward protruding portions for the connection on the outer surface of the lens barrel portion 50 are extremely small. Thus, the external member 68 which covers the outer circumference of the lens barrel portion 50 can have a shape closer to the outer surface of the lens barrel portion 50 and having no protruding portions. This can reduce the size of the video camera.

In addition, since the first, second, and motor connecting members 3, 10, and 17 can only be attached to the outer surface of the barrel-constituting members to connect the barrel-constituting members together, the assembly and disassembly are easy.

As described above, according to the abovementioned embodiment, the first and second members are connected such that they are pulled in by means of the elastic force (restoring force) of the connecting member which can be formed of a thin metal plate, for example. Thus, as compared with the above-mentioned prior art in which flange portions for connection by screws are provided for the first and second members, the protruding portions at the connection can be reduced in size. This can lead to a reduction in size of the optical apparatus. In addition, assembly and disassembly can be performed easily.

The present invention is not limited to the structure described in the abovementioned embodiment, and another structure may be employed as long as it corresponds to a structure in any of the appended claims. For example, the abovementioned embodiment has been described in conjunction with the connecting member formed of a phosphor bronze plate for spring, but it may be formed of another metal sheet or resin such as plastic. When it is formed of plastic, the thickness needs to be increased in order to provide the same strength as that of the metal sheet.

In addition, while the above-mentioned embodiment has been described in conjunction with the video camera integral with a lens, the present invention is applicable to another optical apparatus such as a digital still camera integral with a lens and an interchangeable lens.

Furthermore, the present invention is not limited to these preferred embodiments and various variations and modifications may be made without departing from the scope of the present invention.

This application claims foreign priority benefits based on Japanese Patent Application No. 2006-174416, filed on Jun. 23, 2006, which is hereby incorporated by reference herein in its entirety as if fully set forth herein.

What is claimed is:

1. An optical apparatus comprising:
    a first member and a second member which constitute a lens barrel for accommodating a lens; and
    a connecting member which connects the first and second members together,
    wherein the connecting member is formed of a plate-like member placed along outer surfaces of the first and second members, is elastically deformed when the connecting member is attached to the first and second members, and pulls the first and second members in and connects them with elastic force caused by the elastic deformation; and
    wherein a portion of the connecting member that allows the elastic force to act on at least one of the first and second members has two oblique surfaces inclined by the same angle with respect to an axis such that the oblique surfaces are symmetric with respect to the axis, the axis extending in parallel with a direction in which the first and second member are pulled in.

2. The optical apparatus according to claim 1, wherein the connecting member consists of a metal plate.

3. The optical apparatus according to claim 1, wherein at least one of the first and second members has a deformation limiting portion which limits the deformation of the connecting member with force applied in a direction in which the first and second members are pulled apart.

4. The optical apparatus according to claim 1, wherein the connecting member has an opening formed therein, and
    an edge of the opening allows the elastic force to act on the first and second members.

5. The optical apparatus according to claim 1, wherein the connecting member includes a removal preventing portion for preventing the connecting member from removal of the connecting member from the first and second members.

6. The optical apparatus according to claim 5, wherein the direction in which the first and second members are pulled in is a direction in parallel with an optical axis of the optical apparatus, and
the removal preventing portion is attached to at least one of the first and second members by a screw extending in a direction in parallel with a plane orthogonal to the optical axis.

7. The optical apparatus according to claim 6, wherein the screw secures a third member placed inside the lens barrel.

8. The optical apparatus according to claim 5, further comprising an image stabilization unit placed between the first and second members, wherein the connecting member includes the removal preventing portion on the side of the first member and on the side of the second member with the image stabilization unit placed therebetween.

9. The optical apparatus according to claim 1, wherein the first and second members include an engagement portion which achieves, through engagement, relative positioning of the first and second members in a direction orthogonal to the direction in which the first and second members are pulled in, and
the engagement portion is placed on the inner side of an attachment area for the connecting member in the lens barrel.

* * * * *